(12) United States Patent
Takebayashi et al.

(10) Patent No.: US 6,714,244 B1
(45) Date of Patent: Mar. 30, 2004

(54) INTERNAL INDICATION OF A VIEWFINDER OF A CAMERA

(75) Inventors: Tatsuhide Takebayashi, Tokyo (JP); Takayuki Sensui, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/373,721

(22) Filed: Aug. 13, 1999

(30) Foreign Application Priority Data

Aug. 13, 1998 (JP) .......................................... 10-228988
Aug. 13, 1998 (JP) .......................................... 10-228989

(51) Int. Cl.[7] .......................... H04N 5/222; G08B 3/00; G08B 5/00; G08B 7/00; G08B 7/28
(52) U.S. Cl. ............................. 348/333.02; 348/333.04; 348/333.08; 348/333.09; 348/333.1; 340/691.1; 340/691.6; 396/112; 396/113
(58) Field of Search ........................ 348/333.01, 333.02, 348/333.04, 333.08, 333.09, 333.1; 359/9; 340/691.6; 396/112, 113

(56) References Cited

U.S. PATENT DOCUMENTS

| 4,354,754 A | * | 10/1982 | Takahashi et al. | .......... 396/147 |
|---|---|---|---|---|
| 4,367,463 A | | 1/1983 | Suzuki et al. | |
| 4,949,118 A | * | 8/1990 | Yamamoto et al. | .......... 396/287 |
| 5,235,380 A | * | 8/1993 | Yamada et al. | .............. 396/289 |
| 5,488,446 A | * | 1/1996 | Kirigaya et al. | ............. 396/296 |
| 5,734,428 A | * | 3/1998 | Suda et al. | ................... 348/341 |
| 5,913,087 A | * | 6/1999 | Hirai | ........................... 396/296 |

FOREIGN PATENT DOCUMENTS

| JP | 56-99332 | 8/1981 |
|---|---|---|
| JP | 1277225 | 11/1989 |

* cited by examiner

*Primary Examiner*—Andrew Christensen
*Assistant Examiner*—Brian Genco
(74) *Attorney, Agent, or Firm*—Greenblum & Bernstein, P.L.C.

(57) ABSTRACT

An internal indicator of a viewfinder of a camera includes a viewfinder optical system which includes a focusing screen on which an object image is formed through a photographic optical system of the camera; at least one optical deflector that is positioned on or in the close vicinity of the focusing screen and is provided with at least one deflecting surface; and at least two light emitters for illuminating the optical deflector from the outside of the viewfinder optical system, which emit at least two light beams of different colors to be incident on the optical deflector.

12 Claims, 14 Drawing Sheets

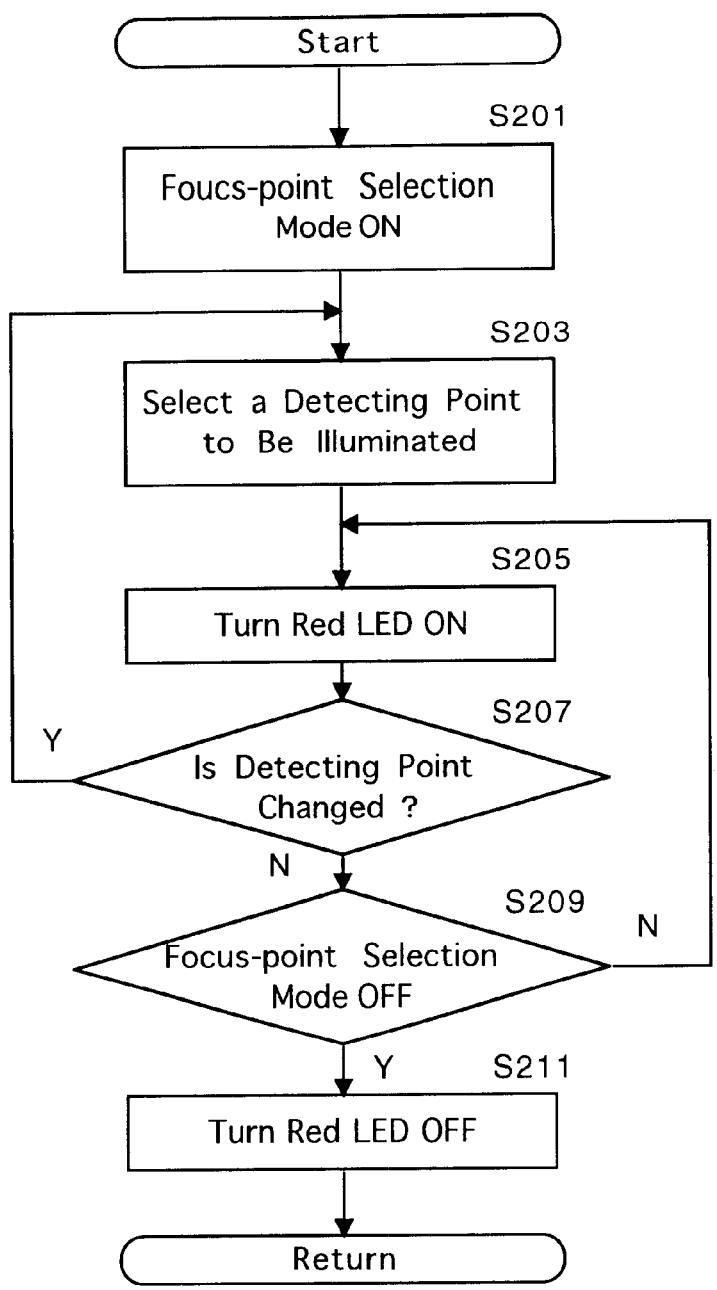

INTERNAL INDICATION OF A VIEWFINDER OF A CAMERA

BACKGROUND OF THE INVENTION

1. Field of the Invention

The present invention relates to an internal indicator of a viewfinder of a camera for visually indicating photographic information in the viewfinder.

2. Description of the Related Art

An SLR (single lens reflex) camera having a multipoint distance measuring system or a multipoint focus detecting system that is provided with a plurality of focus frames (AF frames) seen in the field of view of a viewfinder for indicating focus detection zones or points is known in the art. Furthermore, this type of SLR camera in which one or more focus frame currently selected from among the plurality of focus frames lights up to inform the user of the camera which focus frames have been currently selected is also known in the art.

In such a type of camera in which the currently-selected focus frame or frames light up, there is a known type in which each focus frame is made of an array of minute prisms which are formed integrally onto a focusing screen as a light deflector. This camera is provided therein with at least one light emitter which is positioned outside the viewfinder optical path to illuminate the currently-selected focus frame or frames, so that the currently-selected focus frame or frames can be visually recognized by the user of the camera.

In this known type of camera using such a light emitter positioned outside the viewfinder optical path to illuminate the currently-selected focus frame or frames, each focus frame is illuminated by a corresponding light emitter which emits a monochromatic light (e.g., red light in the case where the light emitter is a red LED). Therefore, each focus frame can only indicate three different states at most (i.e., lighting state, non-lighting state and a flashing on-and-off state), so that each focus frame can only visually inform the camera's user of a very limited amount of photographic information regarding the corresponding focus detection point by changing the state of indication of each focus frame.

SUMMARY OF THE INVENTION

The primary object of the present invention is to provide an internal indicator of a viewfinder of a camera for visually indicating photographic information in the viewfinder, wherein each indicating mark can be indicated in many different states to make it possible to provide the user with an increased amount of photographic information at each mark by changing the state of indication thereof.

To achieve the object mentioned above, according to an aspect of the present invention, there is provided an internal indicator of a viewfinder of a camera that includes a focusing screen on which an object image is formed through a photographic optical system of the camera; at least one optical deflector that is positioned on or in the close vicinity of the focusing screen and is provided with at least one deflecting surface; and, at least two light emitters for illuminating the optical deflector from the outside of the viewfinder optical system, which emit at least two light beams of different colors to be incident on the optical deflector.

With this arrangement, since a plurality of light emitters of different beam colors are provided for illuminating the optical deflector of the indicator, it is possible to provide the user with an increased amount of photographic information by having each mark light up in multicolor.

Preferably, the focusing screen is positioned at a position that is optically equivalent to a focal plane of the photographic optical system, an image formed on the focusing screen being viewed through the viewfinder optical system.

Preferably, the at least one optical deflector is formed integral with the focusing screen.

It is possible that the optical deflector constitutes a plurality of optical deflectors; wherein each optical deflector of the plurality of optical deflectors receives the at least two different colored light beams from respective the at least two light emitters. In such a case, the camera can be constructed as an AF SLR camera having a multipoint focus detecting system, and each of the plurality of optical deflectors can be formed as a focus frame.

In an embodiment, the optical deflector includes an array of deflection prisms, each of the plurality of deflection prisms is formed in a polygonal pyramid shape to have at least three deflecting surfaces, the direction of deflection thereof being different from each other. The corresponding light beams of different colors emitted from the light emitters are incident on the optical deflector at different directions, and are deflected via at least three deflecting surfaces of each of the array of deflection prisms so that deflected light beams of different colors can be viewed through the viewfinder optical system.

In this embodiment, it is preferable that the light emitters, provided for illuminating the optical deflector, include a red light emitter, a green light emitter and a blue light emitter, wherein red, green and blue light beams respectively emitted from the red light emitter, the green light emitter and the blue light emitter are incident on the optical deflector at different directions.

Each of the array of deflection prisms can be formed in a pyramid shape having a square base and four deflecting surfaces.

If the camera includes a mirror box in which a quick-return mirror of the camera is provided, the light emitters can be arranged under the mirror box at different angles relative to the focusing screen.

In another embodiment, the optical deflector includes an array of deflection prisms, each of the array of deflection prisms being formed as an elongated prism having a deflecting surface, the deflecting surfaces of the array of deflection prisms extending parallel to one another. The corresponding at least two light beams of different colors emitted from the at least two light emitters are incident on each of the optical deflector at a common direction, and are deflected via the deflecting surface of each of the array of deflection prisms so that deflected light beams of different colors can be viewed through the viewfinder optical system.

For instance, each of the at least two light emitters, provided for illuminating the optical deflector, includes a pair of two LEDs of different colors.

If the camera includes a mirror box in which a quick-return mirror of the camera is positioned, at least two light emitters can be arranged under the mirror box at the same angle relative to the focusing screen.

According to another aspect of the present invention, there is provided an internal indicator of a viewfinder of a camera, including: a viewfinder optical system including a focusing screen on which an object image is formed through a photographic optical system of the camera; a plurality of indicating marks, positioned on or in the close vicinity of the focusing screen, each indicating a specific point in a field of view of the viewfinder optical system, wherein each of the plurality of indicating marks constitutes an optical deflector; and a plurality of light sources for illuminating the plurality of indicating marks from the outside of an optical path of the viewfinder optical system. Each of the optical deflectors deflects light beams emitted from at least a corresponding one of the plurality of light sources so that the deflected light beams travel along the optical path of the viewfinder optical system to be viewed through the viewfinder optical system. Each of the optical deflectors includes an array of prisms each formed in a polygonal pyramid shape and having at least three deflecting surfaces, the direction of deflection thereof being different from each other. Each of the plurality of light sources includes a plurality of light emitters for emitting a corresponding plurality of light beams towards the plurality of indicating marks, respectively. The plurality of light beams emitted from the plurality of light emitters of one of the plurality of light sources are incident on the plurality of indicating marks in a first direction while the plurality of light beams emitted from the plurality of light emitters of another one of the plurality of light sources are incident on the plurality of indicating marks in a second direction that is different from the first direction. The plurality of light beams emitted from the plurality of light emitters of one of the plurality of light sources have a first color while the plurality of light beams emitted from the plurality of light emitters of another one of the plurality of light sources have a second color that is different from the first color.

According to yet another aspect of the present invention, there is provided an internal indicator of a viewfinder of a camera including: a viewfinder optical system including a focusing screen on which an object image is formed through a photographic optical system of the camera; a plurality of indicating marks, positioned on or in the close vicinity of the focusing screen, each indicating a specific point in a field of view of the viewfinder optical system, wherein each of the plurality of indicating marks constitutes an optical deflector; and a plurality of light sources for respectively illuminating the plurality of indicating marks from the outside of an optical path of the viewfinder optical system. Each of the optical deflectors deflects light beams emitted from a corresponding one of the plurality of light sources so that the deflected light beams travel along the optical path of the viewfinder optical system to be viewed through the viewfinder optical system; and each of the optical deflectors includes an array of prisms, and each of the plurality of light sources includes a plurality of light emitters for emitting light beams of at least two different colors towards a corresponding one of the plurality of indicating marks.

The present disclosure relates to subject matter contained in Japanese Patent Applications No. 10-228988 and No. 10-228989 (both filed on Aug. 13, 1998) which are expressly incorporated herein by reference in their entireties.

BRIEF DESCRIPTION OF THE DRAWINGS

The present invention will be described below in detail with reference to the accompanying drawings in which:

FIG. 16 is a flow chart showing an embodiment of the deflecting portion lighting process which is performed in the second embodiment of the AF SLR camera by a microcomputer provided in the camera body thereof.

DESCRIPTION OF THE PREFERRED EMBODIMENTS

Figure 10:
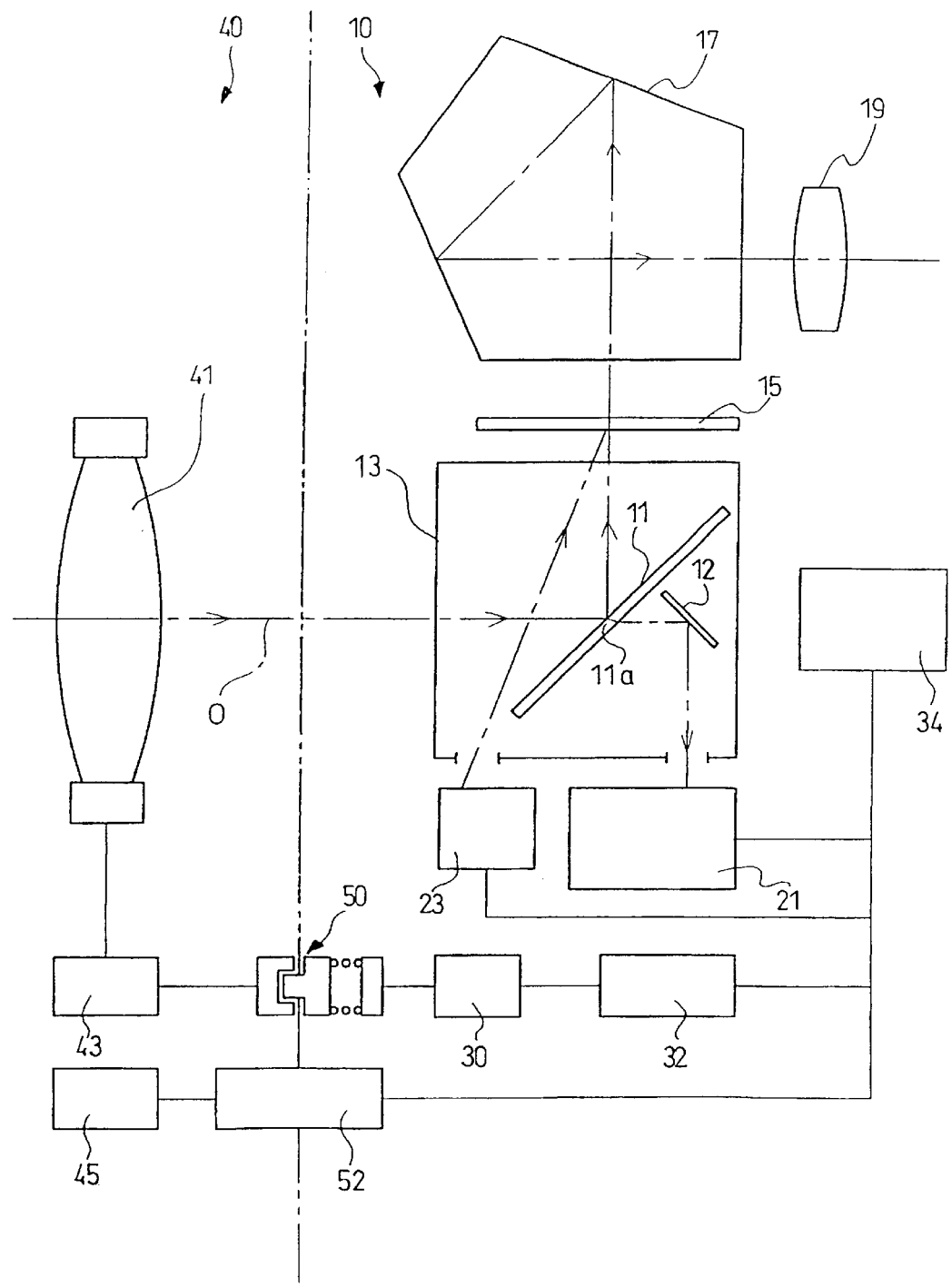
FIG. 10 is a block diagram of fundamental elements of the AF SLR camera to which the present invention is applied.

The first embodiment of an AF SLR camera to which the present invention is applied will be hereinafter discussed with reference to FIGS. 1 through 10. FIG. 10 shows fundamental elements of the first embodiment of the AF SLR camera. The SLR camera (camera system) features a multipoint focus detecting system and is provided with a camera body 10 and an interchangeable photographic lens 40 which can be detachably attached to the front of the camera body 10.

The photographic lens 40 is provided therein with a photographic optical system 41. The photographic optical system 41 includes an AF lens group which is movable along a photographic optical axis O in a lens barrel (not shown). This AF lens group is driven by an AF motor 32 via a gear train 30, an AF coupler 50 and a gear train 43. As shown in FIG. 10, the gear train 30 is positioned in the camera body 10, the gear train 43 is positioned in the photographic lens 40, and the AF coupler 50 is positioned extending over 15 the camera body 10 and the photographic lens 40 therebetween. The photographic lens 40 is provided therein with a ROM 45 in which predetermined lens information is stored. This predetermined lens information is transmitted to a microcomputer 34 provided in the camera body 10 via a plurality of electrical contacts 52. The plurality of electrical contacts 52 are correspondingly provided on the camera body 10 and the photographic lens 40.

The camera body 10 is provided therein with a quick-return mirror 11, a mirror box 13 for supporting the quick-return mirror 11 therein, a pentagonal prism 17 positioned above the mirror box 13, and an eyepiece (magnifier) 19 positioned behind the pentagonal prism 17. The camera body is provided between the mirror box 13 and the pentagonal prism 17 with a focusing screen 15. The camera body 10 is further provided therein under the mirror box 13 with a multipoint focus detecting system 21 and a light emitting system 23.

In a photo-ready state before a shutter release, a major part of the object light which has entered the camera body 10 through the photographic lens 41 is reflected upwardly by the quick-return mirror 11 to be focused on the focusing screen 15. The object image (horizontally inverted image) focused on the focusing screen 15 is inverted horizontally by the pentagonal prism 17 and is viewed as an erect image via the eyepiece 19.

On the other hand, another part of the object light which has entered the camera body 10 through the photographic lens 41 is passed through a half-mirror portion 11$a$ formed on the quick-return mirror 11 to be incident on an auxiliary mirror 12 provided in the back of the quick-return mirror 11. Object light which is incident on the auxiliary mirror 12 is reflected downwardly by the auxiliary mirror 12 to enter the multipoint focus detecting system 21.

The multipoint focus detecting system 21 is provided as a three-point focus detecting system wherein a left detecting point Lp, a central detecting point Cp and a right detecting point Rp are arranged in a line across the center of the field of view (FV) of the viewfinder (i.e., in a line across the center of the focusing screen 15). Autofocusing can be performed on any one of the three points Lp, Cp and Rp. The multipoint focus detecting system 21 employs a phase-difference detecting method for autofocusing and is provided therein with three AF sensors corresponding to the left, central and right detecting points Lp, Cp and Rp, respectively.

The microcomputer 34, which is provided in the camera body 10, performs a predetermined exposure operation in accordance with film-sensitivity information and photometry signals input from a TTL metering system provided in the camera body 10 to calculate an optimal shutter speed and an optimal aperture value. The microcomputer 34 further performs a photographing operation in accordance with the calculated shutter speed and aperture value. In this photographing operation, the quick-return mirror 11 is quickly swung up from the initial position to the photographing position thereof and subsequently a shutter mechanism and a diaphragm mechanism are actuated to exposure a film frame. In this photographing operation, the microcomputer 34 actuates the AF motor 32 to move the AF lens group to an in-focus position thereof to obtain an in-focus state with respect to the object.

Figure 1:
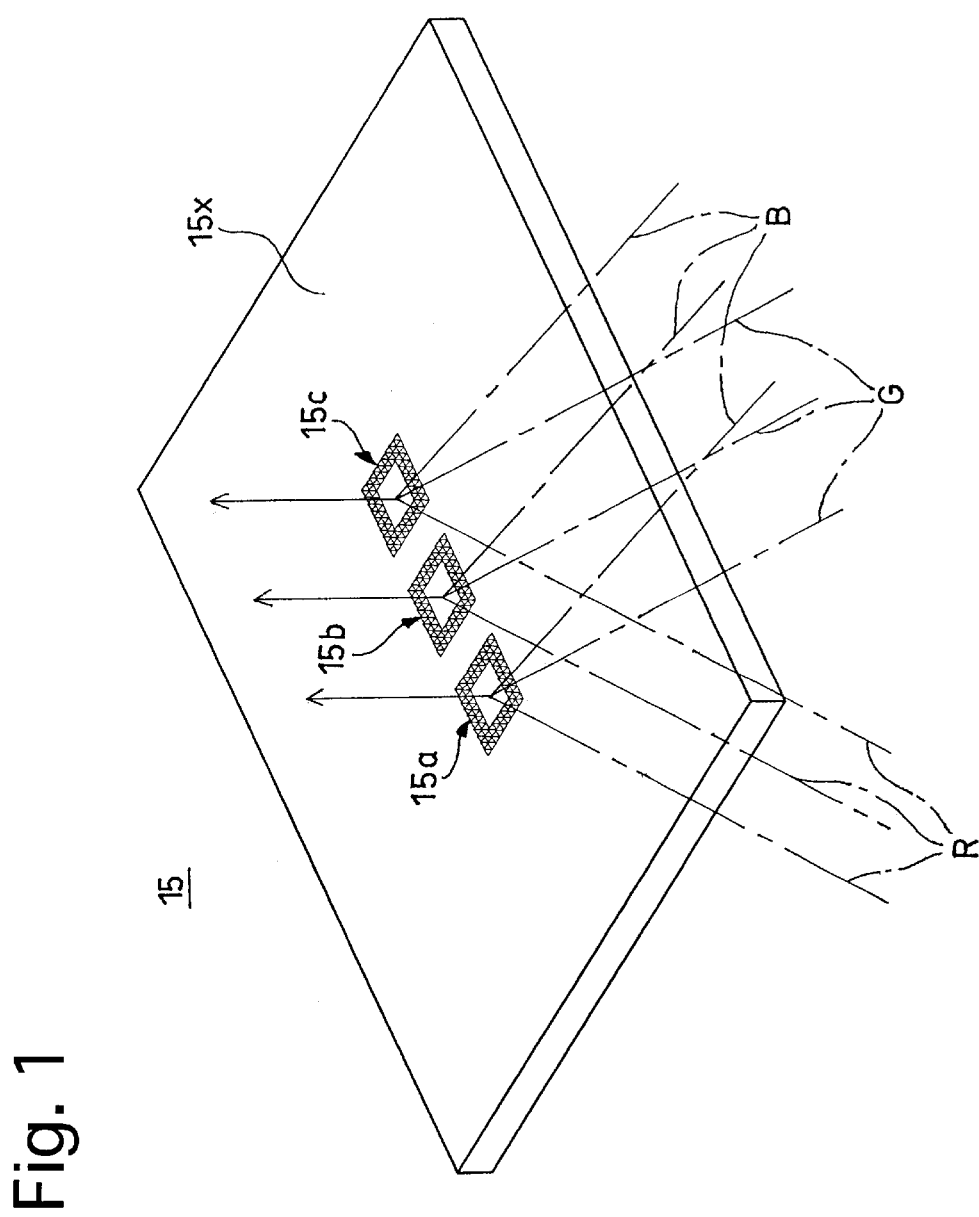
FIG. 1 is a perspective view of a focusing screen of the first embodiment of an AF SLR camera to which the present invention is applied.
Figure 2:
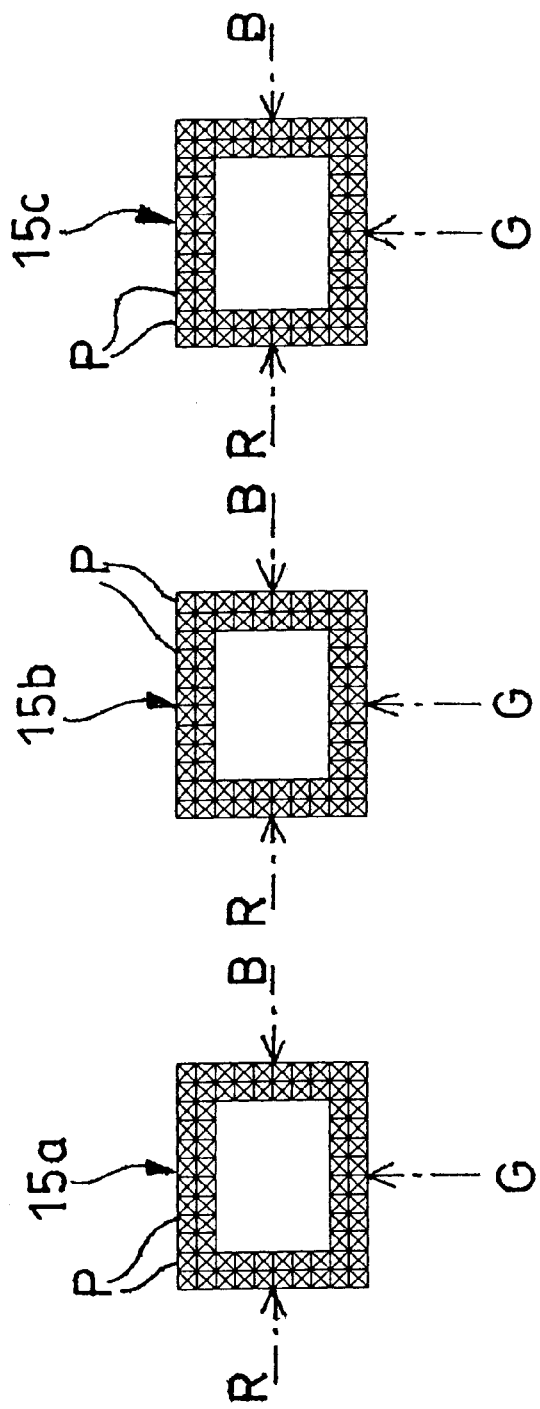
FIG. 2 is a plan view of part of the focusing screen shown in FIG. 1, showing a central deflecting portion, a right deflecting portion and a left deflecting portion which are formed on the focusing screen shown in FIG. 1.

As shown in FIGS. 1 and 2, the focusing screen 15 is provided on the upper surface (matt surface) 15$x$ thereof with three deflecting portions (light deflectors): a left deflecting portion (left mark) 15$a$, a central deflecting portion (central mark) 15$b$ and a right deflecting portion (right mark) 15$c$ which correspond to the left, central and right detecting points Lp, Cp and Rp, respectively. Each of the left, central and right deflecting portions 15$a$, 15$b$ and 15$c$ functions as a focus frame (AF frame) seen in the field of view of the viewfinder through the eyepiece 19.

Figure 3:
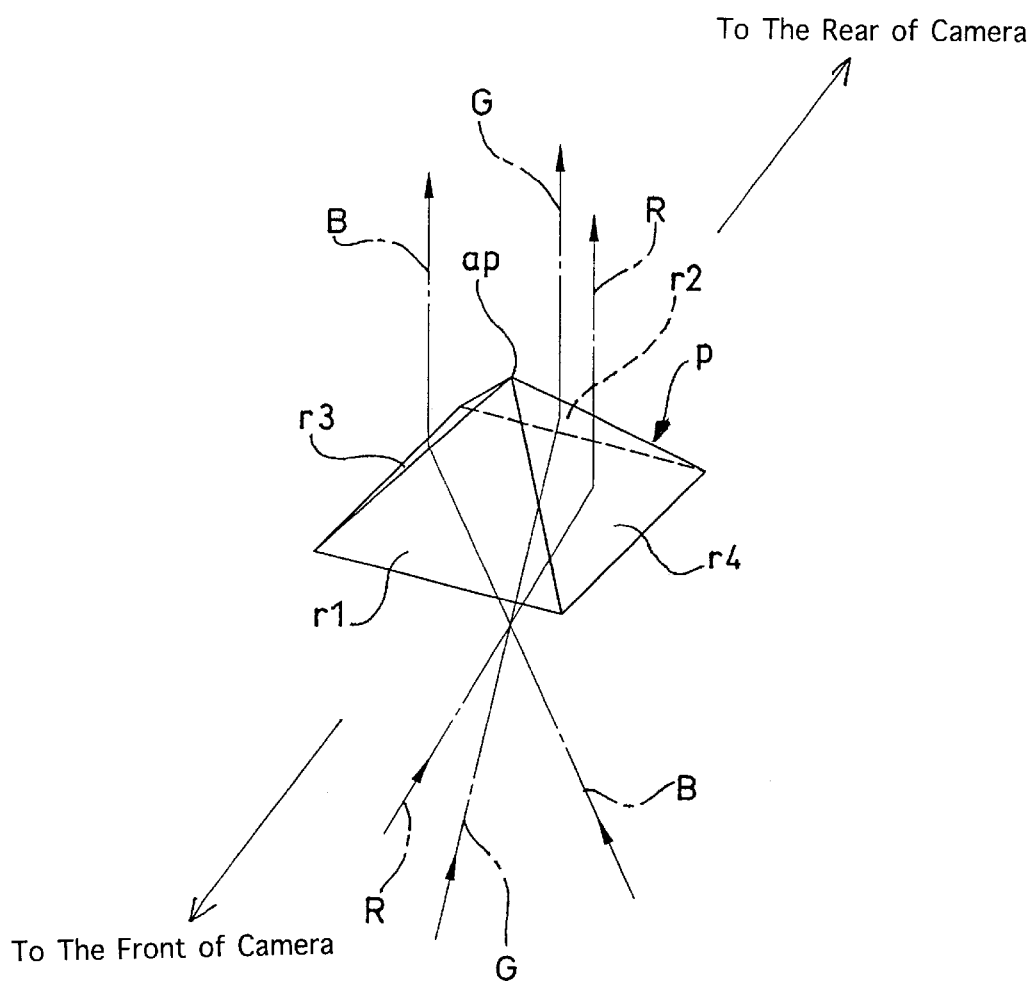
FIG. 3 is a perspective view of any one of a plurality of prisms which constitute each deflecting portion shown in FIG. 2.

Each deflecting portion 15$a$, 15$b$ or 15$c$ is in the form of a rectangular frame, while an array of minute prisms P are arranged along the frame (see FIG. 2). The prisms P are formed integral with the focusing screen 15. The center rectangular portion of each deflecting portion 15$a$, 15$b$ and 15$c$ does not have with any prisms P. Each prism P has a square pyramid base as shown in FIG. 3. Each prism P has an apex ap which is directed to the pentagonal prism 17 and is provided around the apex ap with four triangular surfaces (first through fourth deflecting surfaces r1, r2, r3 and r4). The first deflecting surface r1 of each deflecting prism P is oriented toward the front of the camera (downwards as viewed in FIG. 2). The second deflecting surface r2 of each deflecting prism P is oriented toward the back of the camera (upwards as viewed in FIG. 2). The third deflecting surface r3 of each deflecting prism P is oriented toward the left side of the camera (in the left direction as viewed in FIG. 2). The fourth deflecting surface r4 of each deflecting prism P is oriented toward the right side of the camera (in the right direction as viewed in FIG. 2). Three light beams of different colors which are emitted by corresponding three light sources of the light emitting system 23 are incident on each of the left, central and right deflecting portions 15$a$, 15$b$ and 15$c$ from below the focusing screen 15. The details of the light emitting system 23 will be hereinafter discussed.

Figure 5:
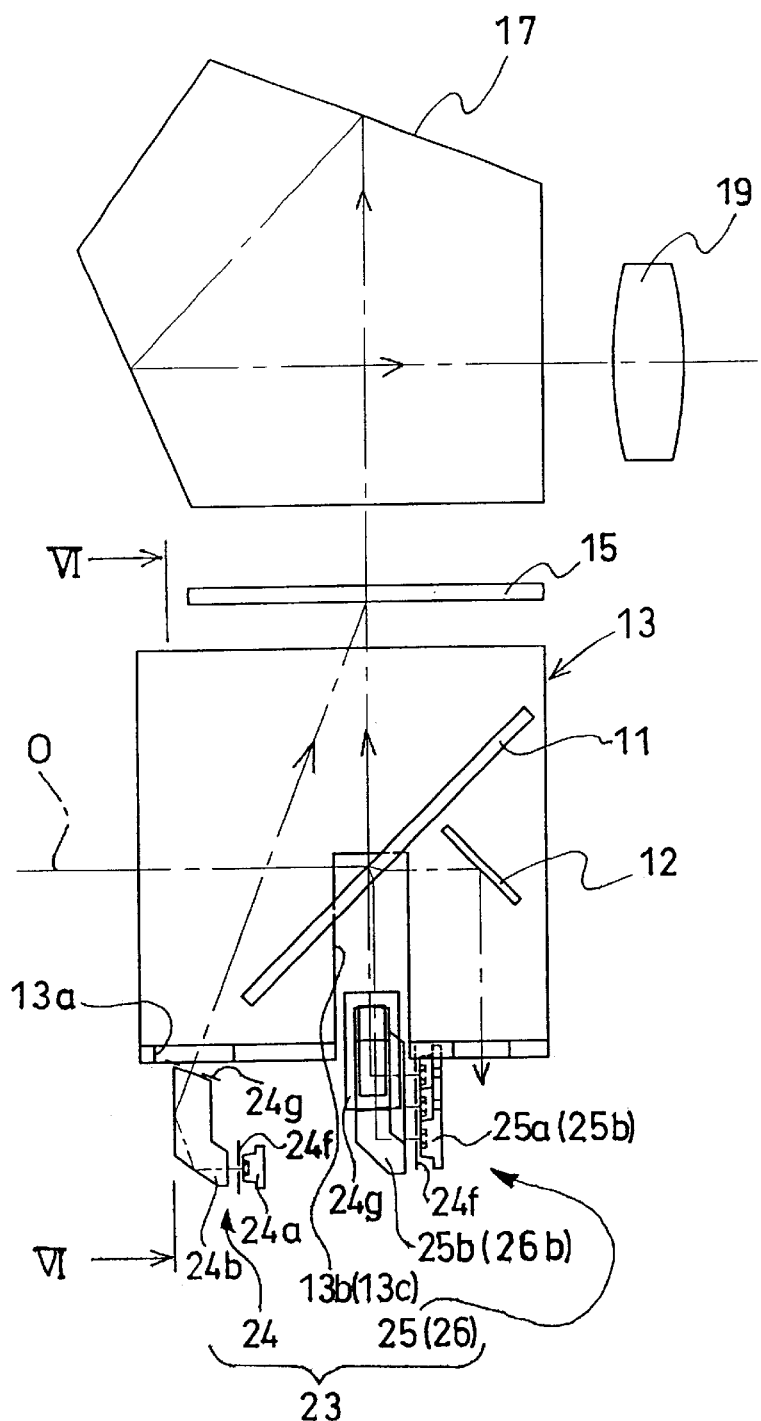
FIG. 5 is a cross sectional view of a fundamental portion of the first embodiment of the AF SLR camera to which the present invention is applied.
Figure 6:
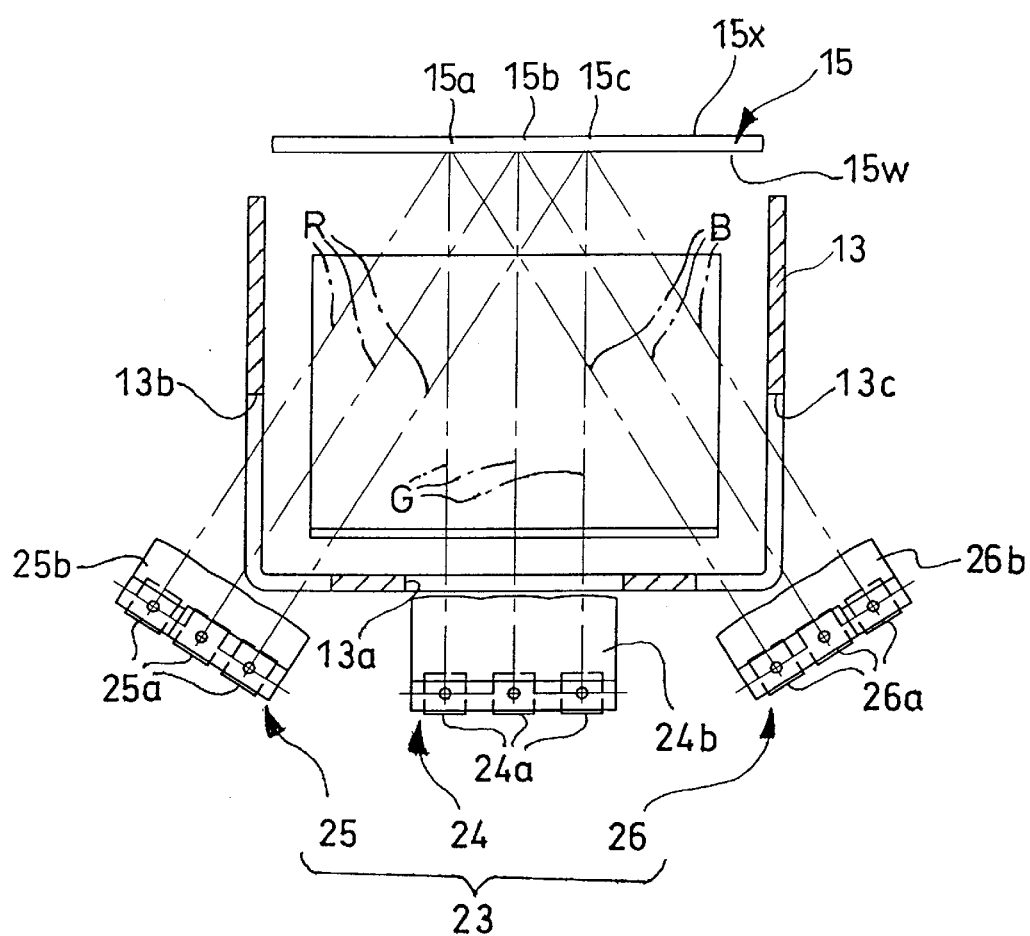
FIG. 6 is a cross sectional view taken along line VI—VI shown in FIG. 5, viewed in the direction of the appended arrows.
Figure 7:
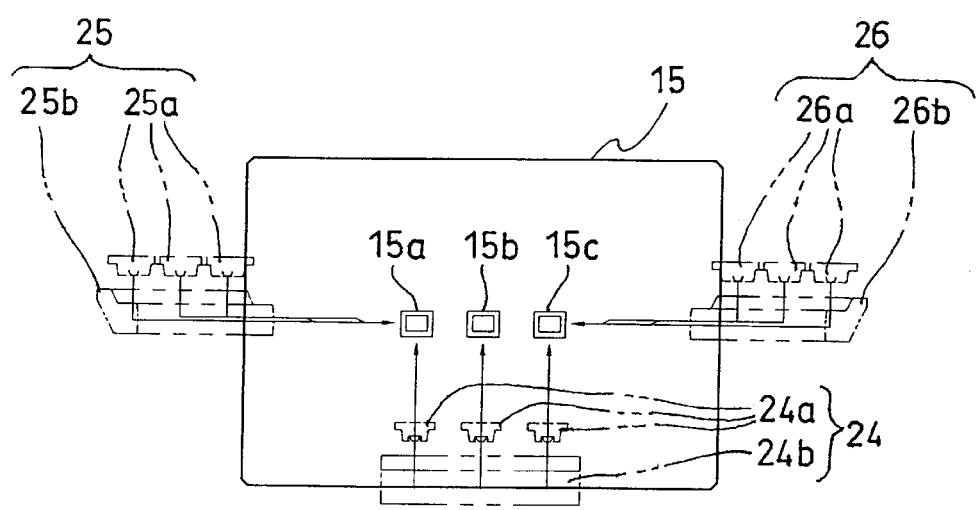
FIG. 7 is a plan view of the focusing screen, viewed from above of FIG. 6.
Figure 9:
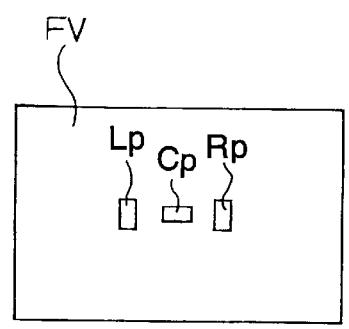
FIG. 9 is a front view of a field of view FV of a viewfinder, showing the arrangement of left, central and right focusing points in the field of view FV.

The light emitting system 23 is positioned under the mirror box 13 and provided with three light emission unit independent of one another: a central green light-emission unit 24, a left red light-emission unit 25 and a right blue light-emission unit 26 (see FIG. 5 and 6). The central green light-emission unit 24, the left red light-emission unit 25 and the right blue light-emission unit 26 correspond to the left deflecting portion 15$a$, the central deflecting portion 15$b$ and the right deflecting portions 15$c$, respectively. The central green light-emission unit 24 is positioned under the mirror box 13 at the front center thereof to face the focusing screen 15 via a central through opening 13$a$ formed at the bottom center of the mirror box 13. The left red light-emission unit 25 is positioned under the mirror box 13 at the left center thereof to face the focusing screen 15 via a left through opening 13$b$ formed at the bottom left corner (bottom right corner as viewed in FIG. 6) of the mirror box 13. The right blue light-emission unit 26 is positioned under the mirror box 13 at the right center thereof to face the focusing screen 15 via a right through opening 13$c$ formed at the bottom right corner (bottom left corner as viewed in FIG. 6) of the mirror box 13.

The central green light-emission unit 24 is provided with three green LEDs (green light emitters) 24$a$ and a prism 24$b$ which deflects respective light beams emitted from the three green LEDs 24$a$ to project the same towards the left, central and right deflecting portions 15$a$, 15$b$ and 15$c$, respectively. The prism 24$b$ is provided on the exit surface thereof with three condenser lenses which are formed integral with the prism 24$b$ to correspond to the three green LEDs 24$a$, respectively. The central green light-emission unit 24 is further provided between the three green LEDs 24$a$ and the incident surface of the prism 24$b$ with a first fixed mask 24$f$ having three apertures corresponding to the three green LEDs 24$a$ for limiting the amount of light (emitted from each green LED 24$a$) that can enter the incident surface of the prism 24b. The central green light-emission unit 24 is further provided between the exit surface of the prism 24b and the central through opening 13a with a second fixed mask 24g having three apertures corresponding to the three green LEDs 24a for limiting the amount of light (emitted from each green LED 24a) that can enter the focusing screen 15 via the central through opening 13a.

The left red light-emission unit 25 is provided with three red LEDs (red light emitters) 25a and a prism 25b which deflects respective light beams emitted from the three red LEDs 25a to project the same towards the left, central and right deflecting portions 15a, 15b and 15c, respectively. The prism 25b is provided on the exit surface thereof with three condenser lenses which are formed integral with the prism 25b to correspond to the three red LEDs 25a, respectively. The left red light-emission unit 25 is further provided between the three red LEDs 25a and the incident surface of the prism 25b with a first fixed mask 24f (the same as the first fixed mask 24f for the central green light-emission unit 24) having three apertures corresponding to the three red LEDs 25a for limiting the amount of light (emitted from each red LED 25a) that can enter the incident surface of the prism 25b. The left red light-emission unit 25 is further provided between the exit surface of the prism 25b and the left through opening 13b with a second fixed mask 24g (the same as the second fixed mask 24g for the central green light-emission unit 24) having three apertures corresponding to the three red LEDs 25a for limiting the amount of light (emitted from each red LED 25a) that can enter the focusing screen 15 via the left through opening 13b.

The right blue light-emission unit 26 is provided with three blue LEDs (blue light emitters) 26a and a prism 26b which deflects respective light beams emitted from the three blue LEDs 26a to project the same towards the left, central and right deflecting portions 15a, 15b and 15c, respectively. The prism 26b is provided on the exit surface thereof with three condenser lenses which are formed integral with the prism 26b to correspond to the three blue LEDs 26a, respectively. The right blue light-emission unit 26 is further provided between the three blue LEDs 26a and the incident surface of the prism 26b with a first fixed mask 24f (the same as the first fixed mask 24f for the central green light-emission unit 24) having three apertures corresponding to the three blue LEDs 26a for limiting the amount of light (emitted from each blue LED 26a) that can enter the incident surface of the prism 26b. The right blue light-emission unit 26 is further provided between the exit surface of the prism 26b and the right through opening 13c with a second fixed mask 24g (the same as the second fixed mask 24g for the central green light-emission unit 24) having three apertures corresponding to the three blue LEDS 26a for limiting the amount of light (emitted from each blue LED 26a) that can enter the focusing screen 15 via the right through opening 13c. Neither the first mask 24f nor the second mask 24g is shown in FIG. 6.

Three green light beams G emitted by the three green LEDs 24a of the central green light-emission unit 24 are respectively incident on the left, central and right deflecting portions 15a, 15b and 15c at a predetermined incident angle via the corresponding first mask 24f, the prism 24b, the corresponding second mask 24g and the central through opening 13a. Green light rays G emitted by each green LED 24a enter the lower surface 15w of the focusing screen 15 and subsequently pass through the second deflecting surfaces r2 of the prisms P of the corresponding deflecting portion 15a, 15b or 15c to proceed towards the pentagonal prism 17. In other words, green light rays G emitted by each green LED 24a are deflected by the second deflecting surfaces r2 of the prisms P of the corresponding deflecting portion 15a, 15b or 15c to travel along the viewfinder optical path to be viewed by the user via the eyepiece 19.

Likewise, three red light beams R emitted by the three red LEDs 25a of the left red light-emission unit 25 are respectively incident on the left, central and right deflecting portions 15a, 15b and 15c at a predetermined incident angle via the corresponding first mask 24f, the prism 25b, the corresponding second mask 24g and the left through opening 13b. Red light rays R emitted by each red LED 25a enter the lower surface 15w of the focusing screen 15 and subsequently pass through the fourth deflecting surfaces r4 of the prisms P of the corresponding deflecting portion 15a, 15b or 15c to proceed towards the pentagonal prism 17. In other words, red light rays R emitted by each red LED 25a are deflected by the fourth deflecting surfaces r4 of the prisms P of the corresponding deflecting portion 15a, 15b or 15c to travel along the viewfinder optical path to be viewed by the user via the eyepiece 19.

Likewise, three blue light beams B emitted by the three blue LEDs 26a of the right blue light-emission unit 26 are respectively incident on the left, central and right deflecting portions 15a, 15b and 15c at a predetermined incident angle via the corresponding first mask 24f, the prism 26b, the corresponding second mask 24g and the right through opening 13c. Blue light rays B emitted by each blue LED 26a enter the lower surface 15w of the focusing screen 15 and subsequently pass through the third deflecting surfaces r3 of the prisms P of the corresponding deflecting portion 15a, 15b or 15c to proceed towards the pentagonal prism 17. In other words, blue light rays B emitted by each blue LED 26a are deflected by the third deflecting surfaces r3 of the prisms P of the corresponding deflecting portion 15a, 15b or 15c to travel along the viewfinder optical path to be viewed by the user via the eyepiece 19. Although each of the red, green and blue light beams R, G and B enters each of the first through fourth deflecting surfaces r1, r2, r3 and r4 and peripheral surface thereof, only the emergent light rays emerged from the second, third or fourth deflecting surface r2, r3 or r4 proceed towards the eyepiece 19 via the pentagonal prism 17.

Figure 4:
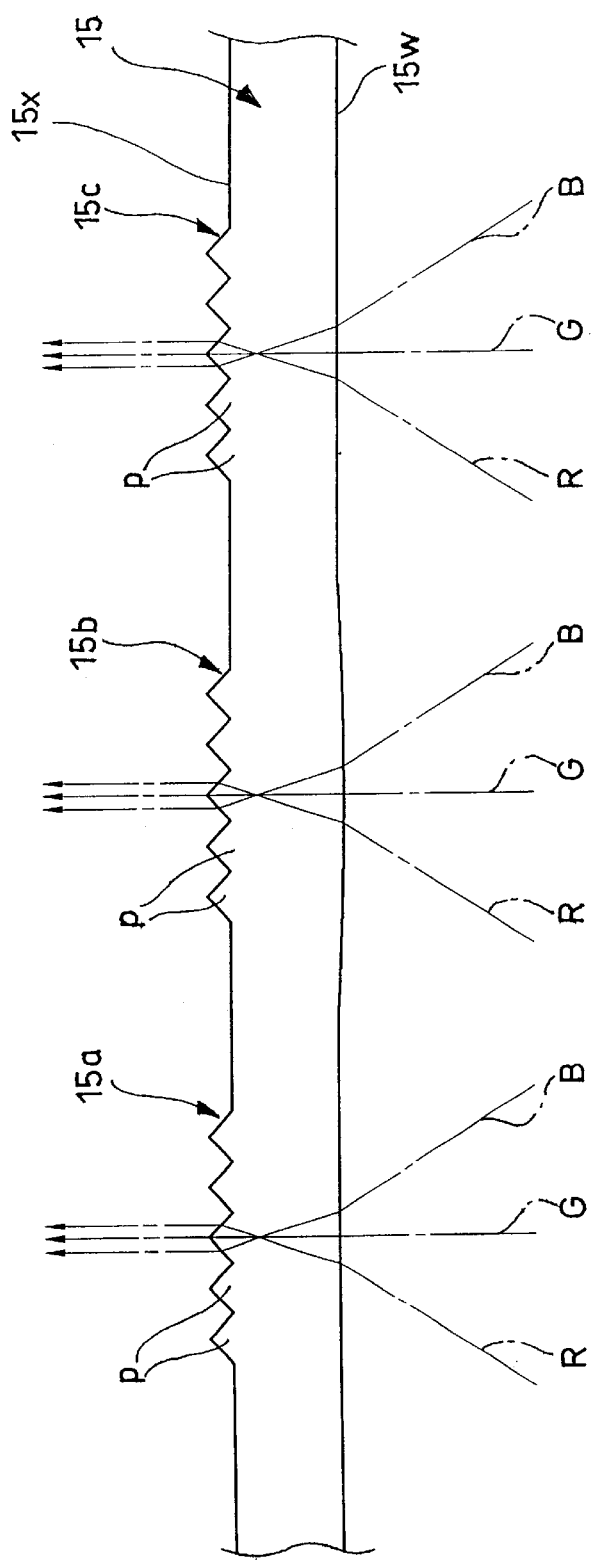
FIG. 4 is a cross sectional view of part of the focusing screen shown in FIG. 1, illustrating a state of light rays deflected by each deflecting portion formed on the focusing screen.

FIG. 4 shows a state of light rays of the red, green and blue light beams R, G and B respectively emitted by the left red light-emission unit 25, the central green light-emission unit 24 and the right blue light-emission unit 26 to be deflected by each of the left, central and right deflecting portions 15a, 15b and 15c. As can be appreciated from FIG. 4, the red, green and blue light beams R, G and B which enter a common prism P are deflected thereby to be projected towards the pentagonal prism 17 in a direction substantially perpendicular to the focusing screen 15. In other words, the red, green and blue light rays R, G and B, which are incident on the lower surface 15w of the focusing screen 15 at different directions, are projected from the common prism P so as to be substantially parallel to each other.

Therefore, each of the left, central and right deflecting portions 15a, 15b and 15c (i.e., each focus frame) can be lit up in multicolor (any desired color) by way of controlling the amount of light of the red, green and blue light beams R, G and B emitted by the left red light-emission unit 25, the central green light-emission unit 24 and the right blue light-emission unit 26, respectively. The left, central and right deflecting portions 15a, 15b and 15c, and the central green light-emission unit 24, the left red light-emission unit 25 and the right blue light-emission unit 26 are fundamental elements of the internal indicator of the viewfinder provided in the first embodiment of the AF SLR camera.

Figure 8:
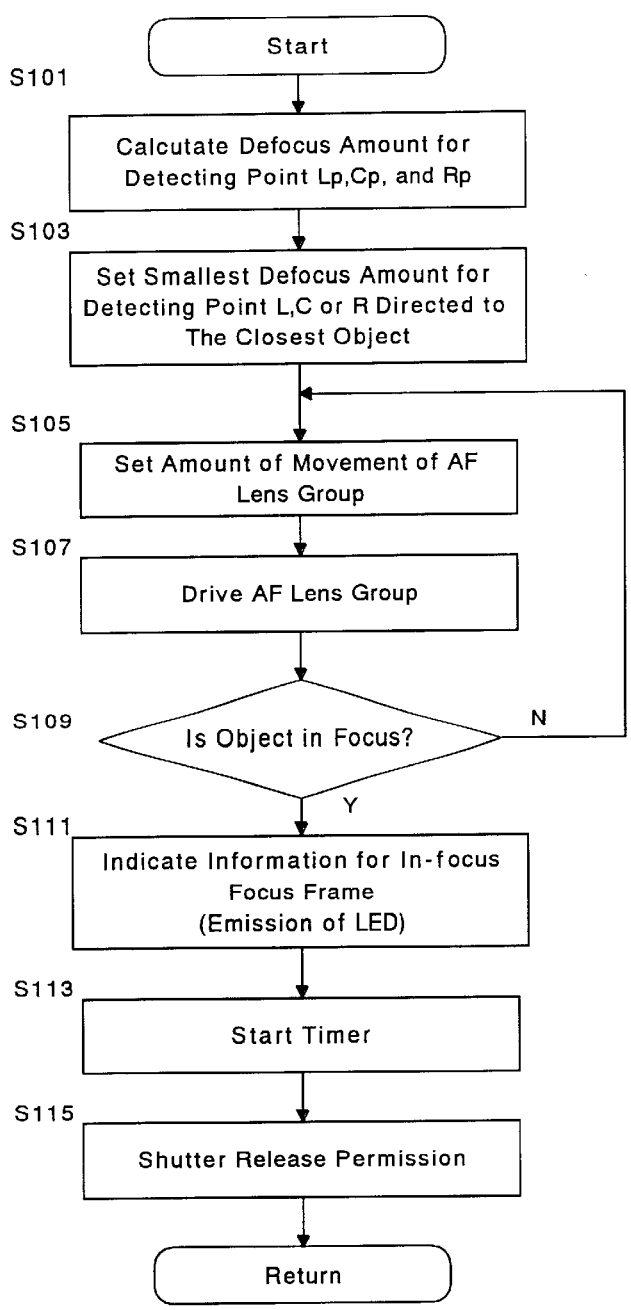
FIG. 8 is a flow chart showing an embodiment of the deflecting portion lighting process which is performed in the first embodiment of the AF SLR camera by a microcomputer provided in the camera body thereof.

FIG. 8 shows an embodiment of the deflecting portion lighting process which is performed by the microcomputer 34. In the first embodiment of the AF SLR camera, upon the shutter release button of the camera body 10 being depressed halfway down, the amount of defocus is calculated for each of the left, central and right detecting points Lp, Cp and Rp; subsequently, the object is brought into focus in accordance with the calculated amounts of defocus. Thereafter, upon the shutter release button of the camera body 10 being fully depressed, the shutter release operation is carried out. Control enters the deflecting portion lighting process shown in FIG. 8 upon the shutter release button being depressed halfway down.

In the deflecting portion lighting process, at first, the amount of defocus for each of the left, central and right detecting points Lp, Cp and Rp is calculated (step S101). Thereafter the smallest defocus amount among all the three calculated defocus amounts is stored in a memory (e.g., RAM), which can be provided in the microcomputer 34 (step S101), and the amount of movement of the AF lens group is calculated using the defocus amount stored in the memory to drive the AF lens group by the calculated amount of movement (steps S103, S105 and S107). Thereafter, it is determined whether the object is in focus or out of focus (at step S109). Control proceeds to the operation at step S111 in the case where it is determined at step S109 that the object is in focus, but returns to the operation at step S105 if not the case.

In the operation at step S111, at least one of the nine LEDs (i.e., the three green LEDs 24a, the three red LEDs 25a and the three blue LEDs 26a) is controlled to emit light so as to illuminate one of the focus frames (the left, central or right deflecting portion 15a, 15b or 15c) for which the aforementioned smallest amount of defocus has been obtained. Thereafter, the microcomputer 34 starts an internal timer thereof and subsequently issues a shutter release permission signals (steps S113 and S115). Thereafter control returns. In the operation at step S113, all the LEDs 24a, 25a and 26a which are turned ON at the operation at step Sill are turned OFF after a predetermined period of time (e.g., five seconds) elapses from when the timer starts.

In the operation at step Sill, when one of the left, central and right deflecting portions 15a, 15b and 15c is illuminated by controlling corresponding at least one of the nine LEDs, a deflecting portion 15a, 15b or 15c can be lit up in multicolor (any desired color) by controlling the amount of light of the corresponding at least one of the nine LEDs. For instance, any one of the left, central and right deflecting portions 15a, 15b and 15c, respectively, can be made to light up in red, green and blue when it is selected, when the object is in focus and when the object is back-lit even though the object is in focus. When it is desired to make any deflecting portion 15a, 15b or 15c light up in a color other than red, green and blue, a combination of at least two LEDs of the green, red and blue LEDs of the emission units 24, 25 and 26 can be made to emit light simultaneously while controlling the amount of light emission thereof.

As can be understood from the foregoing, according to the first embodiment of the AF SLR camera to which the present invention is applied, each of the left, central and right deflecting portions 15a, 15b and 15c (i.e., each focus frame) can be lit up in multicolor (any desired color) by controlling the amount of light of each of the red, green and blue light beams R, G and B emitted by the left red light-emission unit 25, the central green light-emission unit 24 and the right blue light-emission unit 26, respectively. Hence, it is possible to provide the user with more photographic information by changing the lighting color of each of the left, central and right deflecting portions 15a, 15b and 15c. Furthermore, it is possible to provide the user with much more photographic information not only by turning each of the left, central and right deflecting portions 15a, 15b and 15c ON and OFF but also by making the same flash ON and OFF.

In the first embodiment, the camera body 10 is provided with the three light emission units (i.e., the central green light-emission unit 24, the left red light-emission unit 25 and the right blue light-emission unit 26) and the corresponding three detecting portions (i.e., the left, central and right deflecting portions 15a, 15b and 15c) corresponding to the three light emission units. However, the present invention is not limited solely to this particular structure. Namely, the camera body 10 can be provided with merely two of the three light emission units and the corresponding two of the three detecting portions. For instance, the camera body 10 can be provided with only the central green light-emission unit 24 and the left red light-emission unit 25. In this case, each of the left, central and right deflecting portions 15a, 15b and 15c cannot be lit up in multicolor but can be lit up in at least any one of the three different colors: red, green and orange (a mixture of red and green). Therefore, it is possible to provide the user with an increased amount of photographic information by changing the state of indication of each of the left, central and right deflecting portions 15a, 15b and 15c.

In the first embodiment, each prism P has a square pyramid shape as shown in FIG. 3. However the present invention is not limited solely to this particular embodiment. Namely, a similar effect can be expected even if each prism P is formed having any polygonal pyramid shape such as a triangular pyramid or a pentagonal pyramid. In this case, each of the central green light-emission unit 24, the left red light-emission unit 25 and the right blue light-emission unit 26 needs to be positioned relative to the corresponding deflecting surface of each prism P so that light beams emitted from each of the central green light-emission unit 24, the left red light-emission unit 25 and the right blue light-emission unit 26 are incident on the corresponding deflecting surfaces of the prisms P at an appropriate incident angle.

FIGS. 11 through 16 show the second embodiment of an AF SLR camera to which the present invention is applied. FIG. 10 shows fundamental elements of the first embodiment of the AF SLR camera. Similar to the first embodiment of the AF SLR camera, the second embodiment of the AF SLR camera is also provided with an internal indicator of the viewfinder having three focus frames (which indicate the left, central and right detecting points Lp, Cp and Rp) for providing an increased amount of photographic information. In the second embodiment, members or elements which are similar to those in the first embodiment are designated by the same reference designators.

Figure 11:
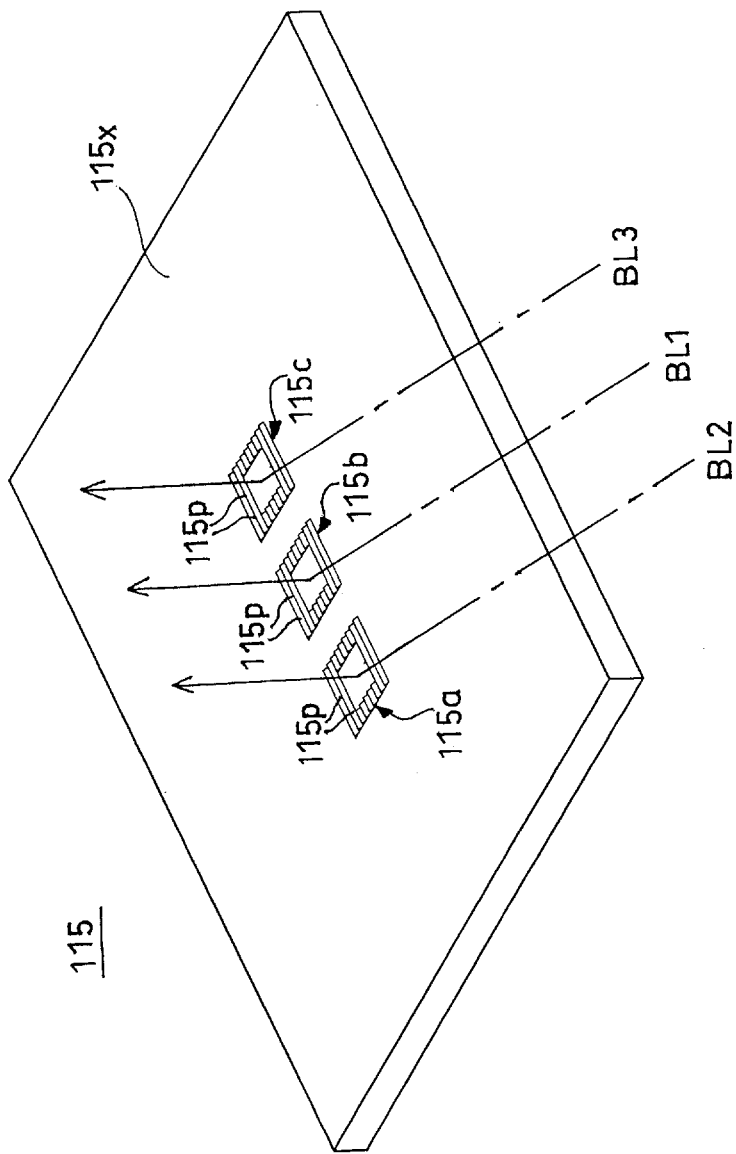
FIG. 11 is a perspective view of a focusing screen of the second embodiment of an AF SLR camera to which the present invention is applied.
Figure 12:
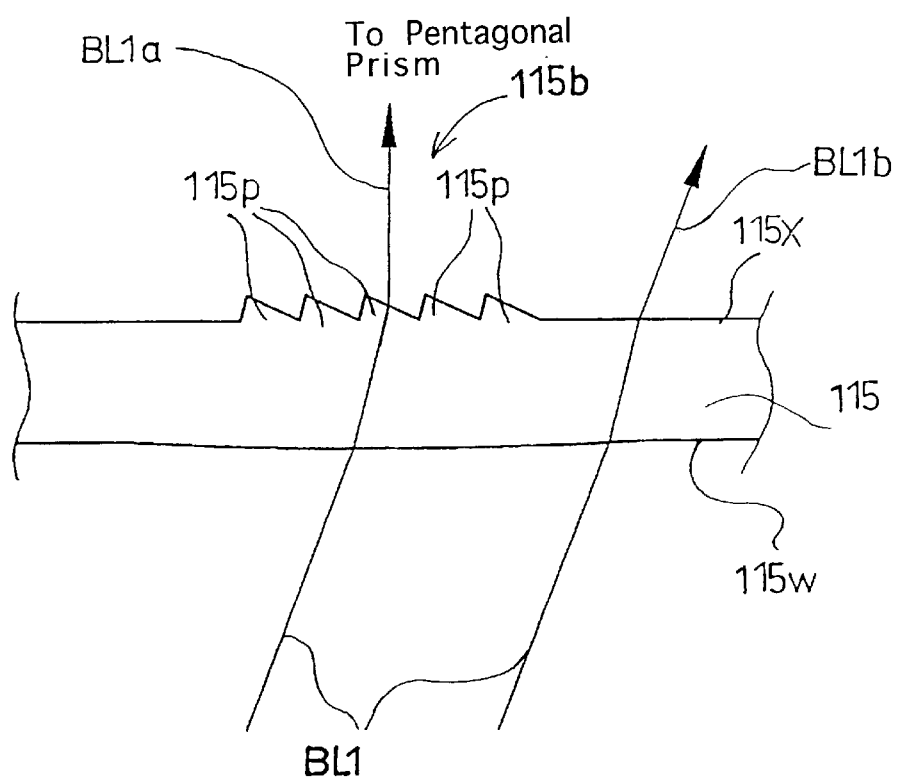
FIG. 12 is a cross sectional view of part of the focusing screen shown in FIG. 11, illustrating a state of a light ray deflected by a central deflecting portion formed on the focusing screen.

FIG. 11 shows a focusing screen 115 of the second embodiment of the AF SLR camera, which corresponds to the focusing screen 15 of the first embodiment, to which the present invention is applied. As shown in FIG. 11, the focusing screen 115 is provided on the upper surface (matt surface) 115x thereof with three deflecting portions: a left deflecting portion 115a, a central deflecting portion 115b and a right deflecting portion 115c which correspond to the left, central and right detecting points Lp, Cp and Rp, respectively. Each of the deflecting portions 115a, 115b and 115c is in the form of a rectangular frame, similar to that in the first embodiment. However, in the second embodiment, an array of minute elongated prisms 115p are formed integral with the focusing screen 115 to be arranged in parallel along the frame as shown in FIG. 11. All the elongated prisms 115p extend parallel to one another in a longitudinal direction (the horizontal direction as viewed in FIG. 13) of the focusing screen 115. Each prism 115p has a triangular cross sectional shape as shown in FIG. 12 and the ridge of each prism 115p extends in the right/left direction of the field of view of the viewfinder, i.e., in the horizontal direction of the camera body 110 (the direction perpendicular to the page of FIG. 15). Two light beams of different colors emitted by a corresponding pair of light emitters of a light emitting system 123 are incident on each of the left, central and right deflecting portions 115a, 115b and 115c from below the focusing screen 115. The details of the light emitting system 123 will be hereinafter discussed.

The light emitting system 123 is provided as a single unit and positioned under a mirror box 113 at the front center thereof. The light emitting system 123 is provided with three light emitting portions: left, central and right light emitting portions 124a, 124b and 124c arranged in the right/left direction of the camera body 110. The left, central and right light emitting portions 124a, 124b and 124c are arranged to correspond to the left, central and right deflecting portions 115a, 115b and 115c, respectively, and to face the focusing screen 115 through a central through opening 113a formed at the bottom center of the mirror box 113.

Figure 13:
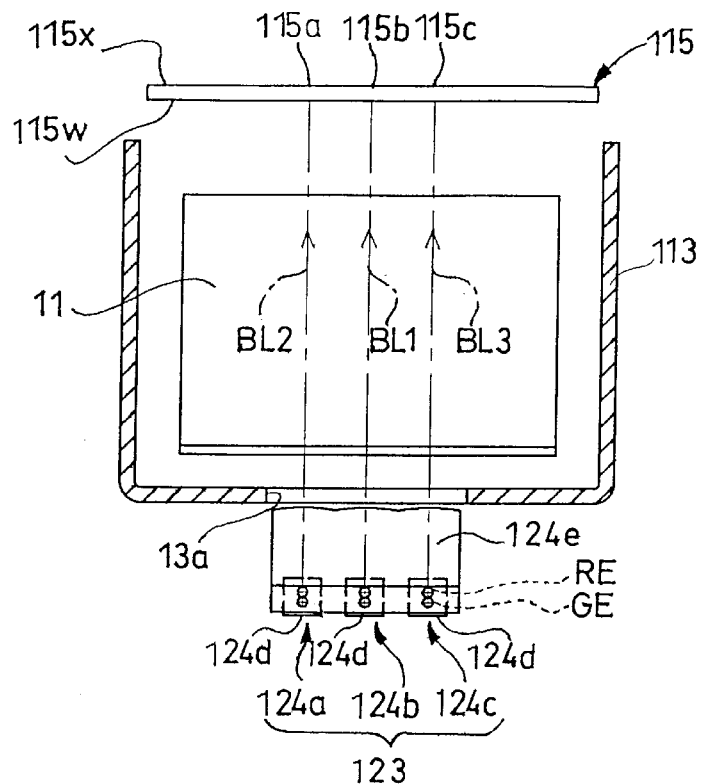
FIG. 13 is a cross sectional view taken along line XIII—XIII of FIG. 15, viewed in the direction of the appended arrows.
Figure 14:
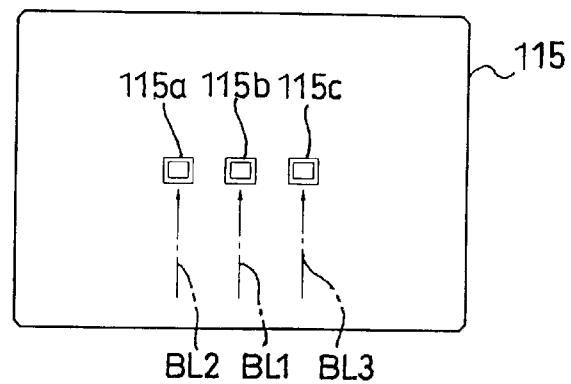
FIG. 14 is a plan view of the focusing screen, viewed from above of FIG. 13.

Each of the left, central and right light emitting portions 124a, 124b and 124c is provided with a light source 124d and a prism 124e which deflects the light beam emitted from the corresponding light source 124d to project the same towards the corresponding deflecting portion 115a, 115b or 115c of the focusing screen 115. Each prism 124e is provided on the exit surface thereof with a condenser lens which is formed integral with the prism 124e. The three prisms 124e are formed integral with one another as a single prism as shown in FIG. 13. The light emitting system 123 is further provided between the three light sources 124d and the incident surfaces of the prisms 124e with a first fixed mask 124f for limiting the amount of light (emitted from each light source 124d) that can enter the incident surfaces of the prisms 124e (see FIG. 15). The light emitting system 123 is further provided between the exit surfaces of the prisms 124e and the central through opening 113a with a second fixed mask 124g for limiting the amount of light (emitted from each light source 124d) that can enter the focusing screen 115 via the central through opening 113a (see FIG. 15). Neither the first mask 124f nor the second mask 124g is shown in FIG. 13.

Each light source 124d is composed of a red LED RE and a green LED GE (light emitters) which are positioned closely to each other to be formed as a unit (two-color LED unit). Therefore, each light source 124d can emit any one of the three different colors: red, green and orange (a mixture of red and green). Three light beams BL1, BL2 and BL3 emitted by the three light sources 124d of the light emitting system 123 are respectively incident on the left, central and right deflecting portions 115a, 115b and 115c at a predetermined incident angle via the corresponding first mask 124f, the prisms 124e, the corresponding second mask 124g and the central through opening 113a. Each of the three light beams BL1, BL2 and BL3 is incident on the corresponding deflecting portion 115a, 115b or 115c in a direction perpendicular to the direction of the ridge of each prism 115p.

FIG. 12 shows a state of light rays of the light beam BL1 deflected by the central deflecting portion 115a formed on the focusing screen 115. As can be appreciated from FIG. 12, a light ray BL1a of the light beam BL1 which is passed through the central deflecting portion 115b formed on the upper surface 115x of the focusing screen 115 to emerge therefrom proceeds towards the pentagonal prism 17 in the direction substantially perpendicular to the focusing screen 115. On the other hand, another light ray BL1b of the light beam BL1 which is passed through a peripheral portion of the central deflecting portion 115b to emerge therefrom does not proceed towards the pentagonal prism 17 because the light ray BL1b emerges from the upper surface 115x of the focusing screen 115 at an emergent angle that is substantially the same as the incident angle of the light ray BL1b on the lower surface 115w of the focusing screen 115. Therefore, only the light rays of the light beam BL1 which are passed through the central deflecting portion 115b reach the eyepiece 19.

In FIG. 12 only a state of light rays of the light beam BL1 deflected by the central deflecting portion 115b formed on the focusing screen 115 is discussed. However, such a state is similar to a state of light rays of either the light beam BL2, that is emitted by the left light emitting portion 124a to be incident on the left deflecting portion 115a, or the light beam BL3, that is emitted by the right light emitting portion 124c to be incident on the right deflecting portion 115c. Namely, only the light rays of the light beam BL2 which are passed through the left deflecting portion 115a reach the eyepiece 19, while only the light rays of the light beam BL3 which are passed through the right deflecting portion 115c reach the eyepiece 19. Hence, when the light beam emitted by any one of the left, central and right light emitting portions 124a, 124b and 124c is incident on the corresponding deflecting portion 115a, 115b or 115c, this deflecting portion lights up in the field of view of viewfinder. Accordingly, when any one of the left, central and right light emitting portions 124a, 124b and 124c emits a red light beam, a green light beam or an orange light beam (which is a mixture of the red light beam and the green light beam), the corresponding deflecting portion 115a, 115b or 115c lights up in that color. The left, central and right deflecting portions 115a, 115b and 115c, and the left light emitting portion 124a, the central light emitting portion 124b and the right light emitting portion 124c are fundamental elements of the internal indicator of the viewfinder provided in the second embodiment of the AF SLR camera.

The second embodiment of the AF SLR camera is controlled by the microcomputer 134 in a manner similar to the first embodiment of the AF SLR camera in accordance with the deflecting portion lighting process shown in FIG. 8 except for the operation at step Sill. Namely, in the second embodiment of the AF SLR camera, upon the shutter release button of the camera body 10 being depressed halfway down, the amount of defocus is calculated for each of the left, central and right detecting points Lp, Cp and Rp and subsequently the object is brought into focus in accordance with the calculated amounts of defocus. Thereafter, upon the shutter release button of the camera body 10 being fully depressed, the shutter release operation is carried out.

In an operation corresponding to the operation at step Sill in FIG. 8, at least one of the six LEDs (i.e., all the red and green LEDs of the three light emitting portions 124a, 124b and 124c) is controlled to emit light so as to illuminate one of the focus frames (the left, central or right deflecting portion 115a, 115b or 115c) for which the smallest amount of defocus has been obtained. In this operation, when one of the left, central and right deflecting portions 115a, 115b and 115c is illuminated by controlling at least one of the corresponding six LEDs, the deflecting portion 115a, 115b or 115c can be lit up in multicolor (red, green or orange) by means of controlling the amount of light of at least one of the corresponding six LEDs. For instance, in the case where any one of the left, central and right detecting points Lp, Cp and Rp can be freely selected to be used for autofocusing, the deflecting portion 115a, 115b or 115c which corresponds to the selected detecting point Lp, Cp or Rp, can be made to light up in red, to turn the light OFF and to light up in green when it is selected, after it is selected and when an in-focus state is obtained at the selected detecting point Lp, Cp or Rp, respectively. Additionally, one of the deflecting portion 115a, 115b or 115c which corresponds to the selected detecting point Lp, Cp or Rp can be made to light up in orange color when the object is back-lit though it is in focus.

Figure 15:
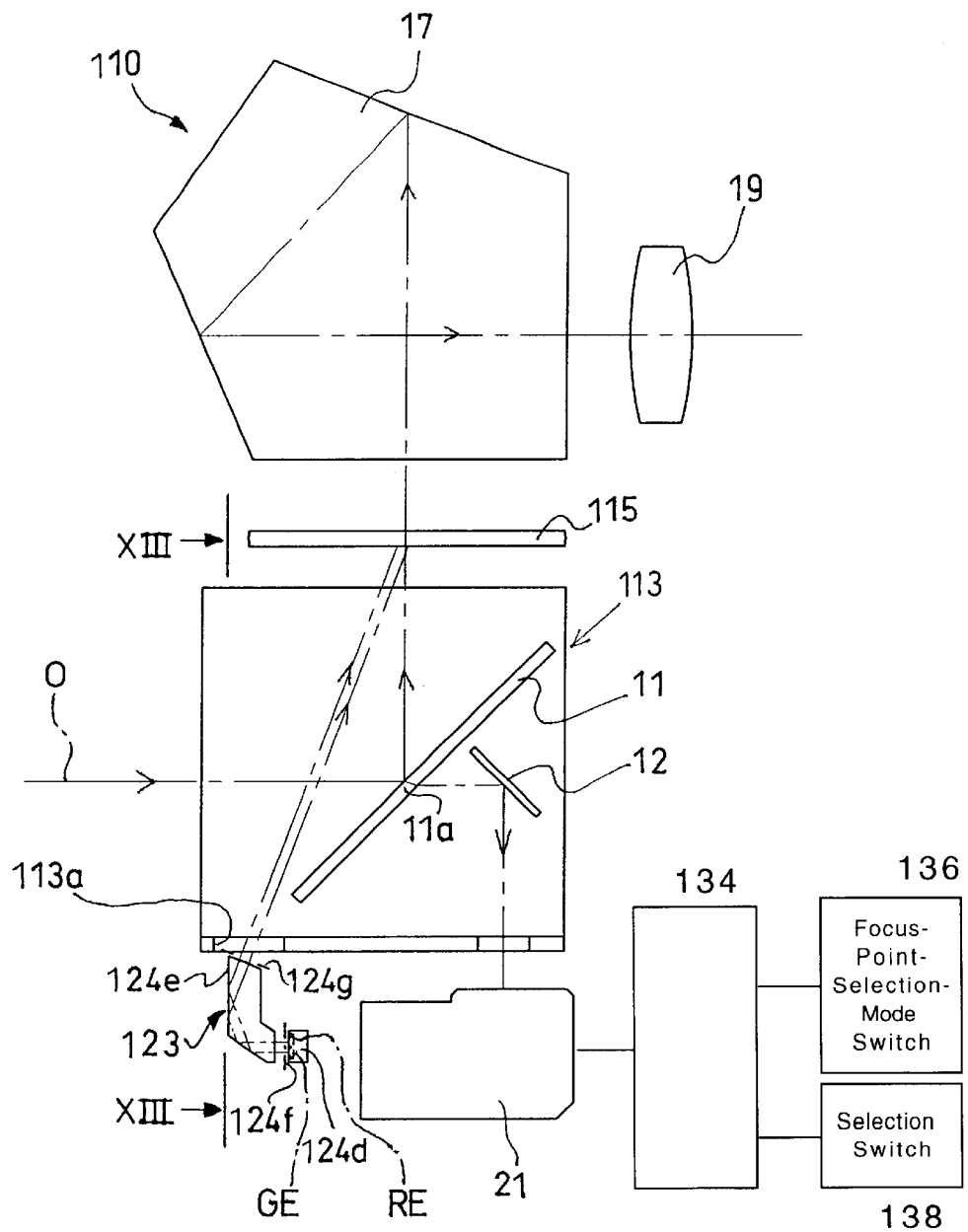
FIG. 15 is a cross sectional view of a fundamental portion of the second embodiment of the AF SLR camera to which the present invention is applied.

FIG. 16 shows an embodiment of the deflecting portion lighting process which is performed in the second embodiment of the AF SLR camera by the microcomputer 134 shown in FIG. 15 in the case where any one of the left, central and right detecting points Lp, Cp and Rp can be freely selected to be used for autofocusing. The AF SLR camera in which this deflecting portion lighting process is performed is provided on the camera body 10 with a focus-point selection mode switch 136 which can be manually operated by the user of the camera. The camera enters into a focus-point selection mode in which any one of the left, central and right detecting points Lp, Cp and Rp can be freely selected to be used for autofocusing when the focus-point selection mode switch 136 is turned ON, while the camera returns to the previous mode (the normal photographing mode) when the focus-point selection mode switch 136 is turned OFF. This AF SLR camera is further provided on the camera body 10 with a selection switch 138 for selecting any one of the left, central and right detecting points Lp, Cp and Rp for autofocusing when the camera is in the focus-point selection mode.

The camera enters into the focus-point selection mode when the focus-point selection mode switch 136 is turned ON (step S201). Thereafter, in the focus-point selection mode, when any one of the left, central and right detecting points Lp, Cp and Rp is selected with the selection switch 138 by the user, the red LED RE of the light source 124d of the corresponding light emitting portion 124a, 124b or 124c is turned ON to emit red light so as to illuminate the deflecting portion 115a, 115b or 115c corresponding to the selected detecting point Lp, Cp or Rp in red (steps S203 and S205). Subsequently, the camera is returned to the normal photographing mode while the aforementioned red LED RE of the light source 124d is turned OFF unless the selection switch 138 is again operated (steps S207, S209, S211). After the camera returns to the normal photographing mode from the focus-point selection mode, when the object is in focus at the selected detecting point Rp, Cp or Lp, the green LED GE of the light source 124d of the corresponding light emitting portion 124a, 124b or 124c is turned ON to emit green light so as to illuminate the deflecting portion 115a, 115b or 115c corresponding to the selected detecting point Lp, Cp or Rp in green.

As can be understood from the foregoing, according to the second embodiment of the AF SLR camera to which the present invention is applied, each of the left, central and right deflecting portions 115a, 115b and 115c (i.e., each focus frame) can be lit up in multicolor (red, green or orange) by controlling the emissions of the light emitting portions 124a, 124b and 124c. Hence, it is possible to provide the user with an increased amount of photographic information by changing the lighting color of the left, central and right deflecting portions 115a, 115b and 115c. Furthermore, it is possible to provide the user with an increased amount of photographic information not only by turning each of the left, central and right deflecting portions 115a, 115b and 115c ON and OFF, but also by making the same flash ON and OFF.

In the second embodiment of the AF SLR camera, although each of the three light sources 124d is composed of only two LEDs (the red and green LEDs RE and GE), each of the three light sources 124d can be composed of three LEDs of different colors (red, green and blue LEDs). In this case, each of the left, central and right deflecting portions 115a, 115b and 115c can be lit up in multicolor (any desired color) by controlling the amount of light of each LED.

Although the present invention has been discussed regarding the aforementioned embodiments, the present invention is not limited solely to these specific embodiments. For instance, the left, central and right deflecting portions (15a, 15b and 15c, or 115a, 115b and 115c) which function as focus frames are formed on the upper surface of the focusing screen 15 or 115 but can be formed on a transparent plate or the like which is positioned in the close vicinity of the focusing screen. Furthermore, in each of the first and second embodiments, although the camera body is provided with three deflecting portions, the camera body can be provided with only one deflecting portion.

In each of the first and second embodiments, although the camera body is provided with three deflecting portions each functioning as a focus frame and the corresponding three light emitting portions, the camera body can be provided with two, or more than three, deflecting portions each functioning as a focus frame and the corresponding number of light emitting portions.

In each of the first and second embodiments, each deflecting portion (15a, 15b, 15c, 115a, 115b or 115c) is formed to be used as a focus frame but can be formed to be used as an indicating mark for any other purpose.

In each of the first and second embodiments, though only one deflecting portion (15a, 15b, 15c, 115a, 115b or 115c) is illuminated to light up at a time in accordance with the deflecting portion lighting process, more than one deflecting portion can be illuminated to light up at a time.

In each of the first and second embodiments, although the camera to which the present invention is applied is an SLR camera, the present invention can also be applied to a lens-shutter type of camera.

As can be understood from the foregoing, according to the internal indicator of a viewfinder of a camera to which the present invention is applied, since a plurality of light emitters of different beam colors are provided for illuminating an indicating mark which is constructed as an optical deflector, it is possible to provide the user with an increased amount of photographic information by having each mark light up in multicolor.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An internal indicator of a viewfinder of a camera comprising:
   a viewfinder optical system comprising a focusing screen on which an object image is formed through a photographic optical system of said camera;

at least one optical deflector that is positioned in a vicinity of said focusing screen; and at least two light emitters that illuminate said at least one optical deflector from outside of said viewfinder optical system, said at least two light emitters emitting at least two light beams of different colors, wherein each of said at least one optical deflector comprises an array of deflection prisms, each said array of deflection prisms comprising polygonal pyramid shape prisms each having at least three deflecting surfaces, and the directions of deflection of said at least three deflecting surfaces are different from each other, wherein the at least two light beams of different colors emitted from said at least two light emitters are incident on said at least one optical deflector in different directions, and are deflected via said at least three deflecting surfaces in said array of deflection prisms so that deflected light beams of different colors can be viewed through said viewfinder optical system, wherein said camera comprises a mirror box including a quick-return mirror, wherein said at least two light emitters are arranged under said mirror box at different angles relative to said focusing screen.

2. The internal indicator of a viewfinder according to claim 1, wherein said focusing screen is positioned at a position that is optically equivalent to a focal plane of said photographic optical system, an image formed on said focusing screen being viewed through said viewfinder optical system.

3. The internal indicator according to claim 1, wherein said at least one optical deflector is integral with said focusing screen.

4. The internal indicator of a viewfinder according to claim 1,
wherein said at least one optical deflector comprises a plurality of optical deflectors;
wherein each of said plurality of optical deflectors receives the at least two different colored light beams from said at least two light emitters.

5. The internal indicator according to claim 4, wherein said camera comprises an AF SLR camera having a multipoint focus detecting system, each of said plurality of optical deflectors comprising a focus frame.

6. The internal indicator according to claim 1, wherein said at least two light emitters, comprise a red light emitter, a green light emitter and a blue light emitter, and
wherein red, green and blue light beams respectively emitted from said red light emitter, said green light emitter and said blue light emitter are incident on said at least one optical deflector in different directions.

7. The internal indicator according to claim 1, wherein each deflection prism of said array of deflection prisms comprises a pyramid having a square base and four deflecting surfaces.

8. An internal indicator of a viewfinder of a camera comprising:
a viewfinder optical system comprising a focusing screen on which an object image is formed through a photographic optical system of said camera;
at least one optical deflector that is positioned in a vicinity of said focusing screen; and
at least two light emitters that illuminate said at least one optical deflector from outside of said viewfinder optical system, said at least two light emitters emitting at least two light beams of different colors, wherein each said at least one optical deflector comprises an array of deflection prisms, each of said array of deflection prisms comprising elongated prisms each having a deflecting surface, said deflecting surfaces extending parallel to one another; and wherein the at least two light beams of different colors emitted from said at least two light emitters are incident on said each of said at least one optical deflector in a common direction, and are deflected via said deflecting surface of said each of said array of deflection prisms so that deflected light beams of different colors can be viewed through said viewfinder optical system, wherein said camera comprises a mirror box including a quick-return mirror, wherein said at least two light emitters are arranged under said mirror box at the same angle relative to said focusing screen.

9. The internal indicator according to claim 8, wherein each of said at least two light emitters, comprises a pair of LEDs of different colors.

10. An internal indicator of a viewfinder of a camera, comprising:
a viewfinder optical system comprising a focusing screen on which an object image is formed through a photographic optical system of said camera;
a plurality of indicating marks, positioned in a vicinity of said focusing screen, each of said plurality of indicating marks indicating a specific point in a field of view of said viewfinder optical system, wherein each of said plurality of indicating marks comprises an optical deflector; and
a plurality of light sources that illuminate said plurality of indicating marks from outside of an optical path of said viewfinder optical system;
wherein each of said optical deflectors deflects light beams emitted from at least one of said plurality of light sources so that the deflected light beams travel along the optical path of said viewfinder optical system to be viewed through said viewfinder optical system;
each of said optical deflectors comprises an array of prisms each formed in a polygonal pyramid shape and having at least three deflecting surfaces, the direction of deflection of said at least three deflecting surfaces being different from each other;
each of said plurality of light sources comprises a plurality of light emitters that emits a plurality of light beams towards said plurality of indicating marks, respectively;
the plurality of light beams emitted from said plurality of light emitters of one of said plurality of light sources are incident on said plurality of indicating marks in a first direction, and the plurality of light beams emitted from said plurality of light emitters of another one of said plurality of light sources are incident on said plurality of indicating marks in a second direction that is different from the first direction; and
the plurality of light beams emitted from said plurality of light emitters of one of said plurality of light sources have a first color, and the plurality of light beams emitted from said plurality of light emitters of another one of said plurality of light sources have a second color that is different from the first color,
wherein said camera comprises a mirror box including a quick-return mirror,
wherein said plurality of light sources are arranged under said mirror box at different angles relative to said focusing screen.

11. An internal indicator of a viewfinder of a camera comprising:
- a viewfinder optical system comprising a focusing screen on which an object image is formed through a photographic optical system of said camera;
- a plurality of indicating marks, positioned in a vicinity of said focusing screen, each of the plurality of indicating marks indicating a specific point in a field of view of said viewfinder optical system, wherein each of said plurality of indicating marks comprises an optical deflector; and
- a plurality of light sources that respectively illuminate said plurality of indicating marks from outside of an optical path of said viewfinder optical system;
- wherein each of said optical deflectors deflects light beams emitted from a corresponding one of said plurality of light sources so that the deflected light beams travel along the optical path of said viewfinder optical system;
- wherein each of said optical deflectors comprises an array of prisms, and each of said plurality of light sources comprises a plurality of light emitters that emit light beams of at least two different colors towards a corresponding one of said plurality of indicating marks,
- wherein said camera comprises a mirror box including a quick-return mirror,
- wherein said plurality of light sources are arranged under said mirror box at different angles relative to said focusing screen.

12. An internal indicator of a viewfinder of a camera comprising:
- a viewfinder optical system comprising a focusing screen on which an object image is formed through a photographic optical system of said camera;
- at least one optical deflector that is positioned in a vicinity of said focusing screen, each said at least one optical deflector having at least one deflecting surface; and
- at least two light emitters that illuminate said at least one optical deflector from outside of said viewfinder optical system, said at least two light emitters emitting at least two light beams of different colors to be incident on said at least one optical deflector,
- wherein said camera comprises a mirror box including a quick-return mirror,
- wherein said at least two light emitters are arranged under said mirror box.

* * * * *